(12) United States Patent
Schimmelpfennig

(10) Patent No.: US 11,243,776 B2
(45) Date of Patent: Feb. 8, 2022

(54) SYSTEMS AND/OR METHODS FOR GENERATING COMPLEX EVENT PROCESSING (CEP) EVENTS AND QUERY DEFINITIONS FOR REAL-TIME DECOMPOSITION OF RESOURCE USAGE DATA

(71) Applicant: Software AG, Darmstadt (DE)

(72) Inventor: Jens Schimmelpfennig, Saarbrücken (DE)

(73) Assignee: SOFTWARE AG, Darmstadt (DE)

( * ) Notice: Subject to any disclaimer, the term of this patent is extended or adjusted under 35 U.S.C. 154(b) by 130 days.

(21) Appl. No.: 16/836,287

(22) Filed: Mar. 31, 2020

(65) Prior Publication Data
US 2021/0303310 A1  Sep. 30, 2021

(51) Int. Cl.
| | |
|---|---|
| *G06F 9/54* | (2006.01) |
| *G06F 9/38* | (2018.01) |
| *G06F 9/50* | (2006.01) |
| *G06F 16/9038* | (2019.01) |
| *G06N 20/00* | (2019.01) |
| *G06F 16/9035* | (2019.01) |

(52) U.S. Cl.
CPC .......... *G06F 9/3838* (2013.01); *G06F 9/5055* (2013.01); *G06F 9/5094* (2013.01); *G06F 9/542* (2013.01); *G06F 16/9035* (2019.01); *G06F 16/9038* (2019.01); *G06N 20/00* (2019.01)

(58) Field of Classification Search
None
See application file for complete search history.

(56) References Cited

U.S. PATENT DOCUMENTS

| | | |
|---|---|---|
| 7,233,843 B2 | 6/2007 | Budhraja et al. |
| 8,060,259 B2 | 11/2011 | Budhraja et al. |
| 8,401,710 B2 | 3/2013 | Budhraja et al. |

OTHER PUBLICATIONS

Ulrich Greveler et al., "Multimedia Content Identification Through Smart Meter Power Usage Profiles," Jan. 2012, 16 pages. https://epic.org/privacy/smartgrid/smart_meter.pdf.

(Continued)

*Primary Examiner* — Craig C Dorais
(74) *Attorney, Agent, or Firm* — Nixon & Vanderhye PC

(57) ABSTRACT

Certain example embodiments automatically generate complex event processing (CEP) events and query definitions for real-time decomposition of resource usage data. Component models specifying measureable characteristics related to an aggregate reading and state(s) into which respective components are enterable are defined. For components that can have plural states, the models further specify valid state transitions, including predecessor and/or successor states. Plausible and composite state definitions are generatable from the component models. The former defines when a CEP engine is to trigger a corresponding plausible state event to signify that a corresponding state is potentially active. The latter corresponds to a representation of two or more component states that potentially are concurrently active. The CEP engine is configured to trigger events based on the aggregate reading and the generated plausible and composite state event definitions. The CEP engine can establish individualized component states from the aggregate reading based on triggered events.

27 Claims, 7 Drawing Sheets

(56) References Cited

OTHER PUBLICATIONS

TIBCO StreamBase, 3 pages [electronically retrieved Mar. 27, 2020] https://www.tibco.com/resources/datasheet/tibco-streambase.
Coral8-Home, 6 pages [electronically retrieved Mar. 27, 2020] https://coral8.co/.
Coral8-Services, 6 pages [electronically retrieved Mar. 27, 2020] htips://coral8.co/services/.
Wikipedia-Industry 4.0, 5 pages [electronically retrieved Mar. 31, 2020] https://en.wikipedia.org/wiki/Industry_4.0.
Daniel "Jack" Kelly, "Disaggregating Multi-State Appliances from Smart Meter Data," Presentation, 68 pages [retrieved Mar. 31, 2020] hhttps://jack-kelly.com/files/writing/ICEP_presentation.pdf.
Daniel "Jack" Kelly et al., "Disaggregating Multi-State Appliances from Smart Meter Data," Poster Abstract, 2 pages [electronically retrieved Mar. 31, 2020] http://www.sigmetrics.org/sigmetrics2012/student_poster/SIGMETRICS2012_Poster_Abstract_Kelly.pdf.
Daniel "Jack" Kelly et al., "Smart Meter Disaggregation: Modelling Multi-State Appliances," Mar. 2012, 2 pages.
Daniel "Jack" Kelly et al., "Disaggregating Multi-State Appliances from Smart Meter Data," Student Poster Competition, Jan. 2012, 2 pages.
Jessica Lin et al., "A Symbolic Representation of Time Series, with Implications for Streaming Algorithms," Jun. 13, 2003, 10 pages https://www.cs.ucr.edu/~eamonn/SAX.pdf.
Software AG—Zementis Predictive Analytics, 1 page [electronically retrieved Mar. 31, 2020] https://www.softwareag.com/corporate/products/az/zementis/default.html.
Software AG—Streaming Analytics Tools, 1 page [electronically retrieved Mar. 31, 2020] https://www.softwareag.com/corporate/products/data_analytics/analytics/default.html.
Wikipedia-Finite-State Machine, 7 pages [electronically retrieved Mar. 31, 2020] https://en.wikipedia.org/wiki/Finite-state_machine.
Wikipedia-Haar Wavelet, 8 pages [electronically retrieved Mar. 31, 2020] https://en.wikipedia.org/wiki/Haar_wavelet.
Software AG—Cumulocity IoT, 5 pages [electronically retrieved Mar. 31, 2020] https://www.softwareag.cloud/site/produd/cumulocity-iot.html#/.
Alfred Haar, "On the Theory of Orthogonal Function Systems," Sep. 1910, pp. 331-371 (with English-language translation) https://link.springer.com/article/10.1007%2FBF01456326.
Software AG—Apama Glossary: Query, 1 page [electronically retrieved Mar. 31, 2020] http://www.apamacommunity.com/documents/10.5.2.0/apama_10.5.2.0_webhelp/webhelp/#page/apama-webhelp%2Fto-apama_glossary_53.html%23wwconnect_header).

SYSTEMS AND/OR METHODS FOR GENERATING COMPLEX EVENT PROCESSING (CEP) EVENTS AND QUERY DEFINITIONS FOR REAL-TIME DECOMPOSITION OF RESOURCE USAGE DATA

TECHNICAL FIELD

Certain example embodiments described herein relate to techniques for decomposing in real-time aggregated resource usage data. More particularly, certain example embodiments described herein relate to systems and/or methods for automatically generating complex event processing (CEP) events and query definitions for real-time decomposition of resource usage data. In certain example embodiments, the usage data may include usage data pertaining to computer processing resources (e.g., CPU and/or memory usage), energy meters, and/or the like.

BACKGROUND AND SUMMARY

With the advent and continued proliferation of digitization in companies, an ever-increasing amount of data can be collected, potentially allowing for more transparency into how internal technology-mediated processes (including those processes that involve computing systems and physical machines) have performed, are performing, and may be expected to perform. For instance, in the context of so-called Industry 4.0, individual production processes can be monitored using sensor data and Internet of Things (IoT) functionalities. Moreover, streaming analytics (including complex event processing (CEP) technology) allows for real-time detection of significant constellations of events, while predictive analytics allows predictions of future events (e.g., particular machine failures in predictive maintenance use cases) to be made.

Although the infrastructure enabling streaming analytics and predictive analytics concepts may be present in "green field" scenarios where new production lines are deployed, there are many existing production lines that lack dedicated sensor/IoT functionalities and thus are "brown field" scenarios where it is difficult to implement these technologies. Brown field scenarios have been found to be present across different enterprises of different types, and they have been found to be especially prevalent in the context of small to mid-size enterprises (SMEs).

As one specific example, in many production lines, energy meters are already present or can be retrofitted with little effort and cost, and with minimal downtimes. Using power consumption readings gained from such existing or introduced meters, current processing steps within the monitored components may be inferred. For instance, detailed profiles of power consumption of individual energy-consuming components can be extracted via configuration runs or machine learning techniques, e.g., if they are already included in product documentation.

In this regard, FIG. 1 shows an example of a power load measured at a power meter, with respective power load profiles for individual manufacturing steps. More particularly, FIG. 1 provides real-world power load profiles for individual machine states including "warm-up," "drilling," and "laser cutting" measured at a sensor, which may take place when processing a piece of sheet metal. In FIG. 1, the horizontal axis represents time, and the vertical axis represents power consumption. Each state is bounded by vertical lines. The data that is plotted represents average energy used (here expressed as $I_{RMS}$, which is the average strength of the current used) for the electricity meter's phase A. Other data for phase A (such as, for example, minimum and maximum $I_{RMS}$ values) is omitted, as is the data for other phases (represented by the B and C labels).

Although data like that provided in FIG. 1 can in some instances be helpful, as alluded to above, there may be multiple power meters provided in connection with a single organization. Moreover, each power meter may, in turn, receive data from any number of individual components that may act in any number of sequences. Yet each power meter will receive only one aggregated energy reading, and only the aggregated energy reading(s) from the individual meter (s) can be monitored.

Thus, it will be appreciated that it would be desirable to provide reading disaggregation, e.g., in connection with power meters or the like. Such disaggregation in turn could be useful in inferring the current state of individual components behind a single measurement (e.g., the current state of individual energy-consuming components behind a single meter). As will be appreciated from the description below, certain example embodiments make it possible to derive or create this new type of data from already-existing data, using already existing or standard IoT sensors or the like.

In the energy context, for example, research has been conducted in the related domain of smart meter disaggregation in energy grids. Here, techniques for classifying households' energy consumption were investigated, purportedly allowing individual households to identify power saving potentials with respect to their installed appliances. For instance, in a poster presented at the Google Poster Competition 2012, Kelly & Knottenbelt proposed a way to model internal components of each appliance in a household, and proposed to define parameterized models for power consumption of each component and probabilistic models for machine state transitions. As another example, Greveler et al. measure the power consumption profile of a television using a smart meter, and to define a power prediction function depending on the brightness of the screen. Here, they analyze whether smart meter data can be used to detect which television program is being watched and whether smart meters pose a threat to household privacy.

In these scientific approaches, computationally-expensive techniques are utilized, as there is no need for real-time results. That is, in these and other instances, time can be taken to gather data, build/train/refine models, execute large and/or slow models on a large amount of data collected over a long period of time, etc. But in situations where real-time monitoring (e.g., of machinery) is desired, such models likely would create a large and potentially unmanageable computational load, in turn creating a processing bottleneck incompatible with the real-time nature needed when implementing streaming analytics and therefore foreclosing the streaming analytics approach.

As a concrete example, it is noted that Zementis Predictive Analytics, commercially available from the instant assignee, delivers a common predictive analytics strategy across the entire Information Technology (IT) ecosystem, fully supporting the Predictive Model Markup Language (PMML) industry standard for data mining applications. Using data mining tooling such as KNIME, R, Python, etc., models can be created and trained that would allow classification of energy meter readings. These models can then either be executed in Zementis, or exported to PMML.

Apama Streaming Analytics, which also is commercially available from the instant assignee, is built on an in-memory architecture that enables real-time processing of extremely fast, large data volumes—including data volumes that are orders of magnitude larger than traditional database-based information technology architectures. Predictive Analytics for Apama is a powerful predictive analytics deployment and execution solution that complements and enhances the capabilities of Apama by enabling organizations to leverage predictive analytics models within Apama Streaming Analytics. The connector is able to execute PMML models. Unfortunately, however, executing complex PMML models (which may be generated using Zementis or based on another scientific approach such as one of those outlined above) takes time and consumes resources, which may create a bottleneck unsuitable for streaming analytics. Moreover, executing such models poses a higher load/demand on computational resources, which may not be feasible for some deployments where real-time data analysis is desired and/or where computation resources are limited. For instance, in one customer case, predictions are only carried out every 15 seconds because of runtime restrictions.

Another technical challenge relates to current IoT infrastructures. That is, current IoT approaches in the context of Industry 4.0 typically require a specialized sensor infrastructure to be installed on-site. Commonly available, general purpose sensors, or other sensors that are already available on-site, typically cannot be used in Industry 4.0 related applications, or at least cannot be easily incorporated into a more holistic or inclusive technological framework.

Still another challenge relates to the fact that complex computational models like predictive analytics models that typically require state information such as a set of previous meter readings are mainly suitable for ex-post analysis or Big Data analytics and thus are not well suited for real-time streaming analytics.

Certain example embodiments help address the above-described and/or other problems.

One aspect of certain example embodiments relates to combining complex event processing technology and data approximation techniques for reading disaggregation, e.g., to infer the current state of individual components behind a single monitor while also attempting to reduce the computational load on the CEP engine. Certain example embodiments implement a novel technology-based component that automatically generates CEP events, as well as event monitors that are to be used in current CEP engines.

One aspect of certain example embodiments relates to real-time monitoring of machinery using an approach that enables real-time streaming analytics techniques to be implemented. Instead of using a more conventional machine-learning approach to address the challenges posed by the scientific approaches discussed above, certain example embodiments create an approximation of predictive analytics models using streaming analytics technology. If the approximation is meets a predetermined condition (e.g., corresponding to the inability to make a classification with or without a desired confidence level, a likely problem or novel state being reached, etc.), a more thorough situational analysis using a more computationally-intensive approach (e.g., a machine learning model etc.) may be implemented, e.g., before taking action.

One aspect of certain example embodiments relates to automatically generating streaming analytics queries, thereby reducing and potentially even eliminating the need for manual, time-intensive and error-prone coding. This advantageously can reduce the time and costs needed to develop a streaming analytics solutions, especially compared to more conventional approaches that involve generating and training machine learning models.

Another aspect of certain example embodiments relates to using an event correlator that classifies for evaluation potentially only one single value, namely, the most recent resource (e.g., power) reading. Even though this approach may not always be able to resolve the definite state of a complex system, it nonetheless may help reduce system load by only referring to complex computational models if there is any doubt regarding the current state.

Another aspect of certain example embodiments relates to providing a technical infrastructure that supports not only specialized IoT sensors installed on-site, but also commonly available general purpose sensors, and other sensors that are already available on-site. For instance, certain example embodiments are able to operate based on power meter readings that are commonly available and/or which may be obtained from low-cost sensors that may be installed easily on-site.

In certain example embodiments, there is provided a computing system, comprising: at least one hardware processor; and a computerized data exchange interface to one or more sensors. The one or more sensors are configured to obtain a multi-component aggregate reading of how a resource is being utilized by one or more of a plurality of components, with each component being a physical machine or element thereof, The at least one hardware processor is configured to control the computing system to perform functionality comprising: for each component able to contribute to the aggregate reading, defining a respective component data structure specifying at least one measureable characteristic of the respective component related to the aggregate reading and at least one state into which the respective component is enterable, at least one of the components being able to enter into plural different states, wherein for each component that is able to enter into plural different states, the respective component data structure further specifies, for each different state, valid state transitions indicative of a predecessor state and/or a successor state; generating, from the component data structures, plausible state definitions defining when an event processing engine is to trigger a corresponding plausible state event to signify that a corresponding state enterable into via one of the components is potentially active; generating, from the component data structures, composite state event definitions, each composite state event definition corresponding to a potential state combination representative of two or more component states that potentially are concurrently active and including one or more required states and/or required state changes to occur within a predetermined time window; configuring the event processing engine to trigger events in dependence on the aggregate reading and the generated plausible state definitions and the generated composite state event definitions; and enabling the event processing engine to establish, based on triggered events, one or more individualized component readings for one or more of the individual components contributing to the multi-component aggregate reading of how the resource is being utilized.

In certain example embodiments, there is provided a method of configuring an event processing engine operably connected to one or more sensors configured to obtain a multi-component aggregate reading of how a resource is being utilized by one or more of a plurality of components. For each component able to contribute to the aggregate reading, a respective component data structure specifying at least one measureable characteristic of the respective component related to the aggregate reading and at least one state into which the respective component is enterable is defined, with at least one of the components being able to enter into plural different states. For each component that is able to enter into plural different states, the respective component data structure further specifies, for each different state, valid state transitions indicative of a predecessor state and/or a successor state. From the component data structures, plausible state definitions defining when the event processing engine is to trigger a corresponding plausible state event to signify that a corresponding state enterable into via one of the components is potentially active are generated. From the component data structures, composite state event definitions are generated, with each composite state event definition corresponding to a potential state combination representative of two or more component states that potentially are concurrently active and including one or more required states and/or required state changes to occur within a predetermined time window. The event processing engine is configured to trigger events in dependence on the aggregate reading and the generated plausible state definitions and the generated composite state event definitions. The event processing engine is configured/enabled able to establish, based on triggered events, one or more individualized component readings for one or more of the individual components contributing to the multi-component aggregate reading of how the resource is being utilized.

In certain example embodiments, there is provided a non-transitory computer readable storage medium tangibly storing instructions that, when executed by a processor, configure an event processing engine operably connected to one or more sensors configured to obtain a multi-component aggregate reading of how a resource is being utilized by one or more of a plurality of components, by at least: for each component able to contribute to the aggregate reading, defining a respective component data structure specifying at least one measureable characteristic of the respective component related to the aggregate reading and at least one state into which the respective component is enterable, at least one of the components being able to enter into plural different states, wherein for each component that is able to enter into plural different states, the respective component data structure further specifies, for each different state, valid state transitions indicative of a predecessor state and/or a successor state; generating, from the component data structures, plausible state definitions defining when the event processing engine is to trigger a corresponding plausible state event to signify that a corresponding state enterable into via one of the components is potentially active; generating, from the component data structures, composite state event definitions, each composite state event definition corresponding to a potential state combination representative of two or more component states that potentially are concurrently active and including one or more required states and/or required state changes to occur within a predetermined time window; configuring the event processing engine to trigger events in dependence on the aggregate reading and the generated plausible state definitions and the generated composite state event definitions; and enabling the event processing engine to establish, based on triggered events, one or more individualized component readings for one or more of the individual components contributing to the multi-component aggregate reading of how the resource is being utilized.

According to certain example embodiments, the at least one measureable characteristic may be a level of resource utilization and/or a duration for which the level of resource utilization is held.

According to certain example embodiments, the at least one measureable characteristic may be determined automatically via one or more calibration runs of each of the components.

According to certain example embodiments, the plausible state definitions for a given component may specify minimal measurable characteristics and/or state transition information indicative of the corresponding plausible state event.

According to certain example embodiments, the generation of composite state event definitions may include generating a list of potential state combinations and optionally filtering the list based on operational interdependencies prior to creation of the composite state event definitions.

According to certain example embodiments, the generation of the plausible state definitions may include generating platform-independent models representing the plausible state definitions and converting the platform-independent models into code for the configuration of the event processing engine.

According to certain example embodiments, when an inference as to individual component states cannot be made by the event processing engine from the aggregate reading based on the triggered events (e.g., because a certainty level threshold/margin cannot be met), a machine-learned model may be triggered for execution, e.g., to make the inference.

Certain example embodiments additionally or alternatively provide runtime transformations of multi-component aggregate reading into one or more individualized component states for one or more individual components. For instance, certain example embodiments relate to techniques (e.g., systems, methods, computer readable storage media including programs, etc.) for transforming a multi-component aggregate reading into one or more individualized component states for one or more individual components in connection with an event processing engine being executed on a computing system including at least one processor and a memory. The event processing engine may be configured in accordance with the techniques described herein. The aggregate reading may be received over an interface connected to one or more sensors. Events may be triggered using the configured event processing engine. The one or more individualized component states may be determined based on the triggered events and the aggregate reading.

According to certain example embodiments, the individualized component readings may be provided to an external component, usage of the resource may be controlled based on the individualized component readings, etc.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to techniques that facilitate the automatic configuration of CEP engines to help disaggregate individual component states (e.g., of a resource such as a manufacturing component, manufacturing workstation, computing resource should as a processor or memory, etc.) from a single sensor reading using complex event processing technology. The techniques of certain example embodiments advantageously allow for existing manufacturing and/or computing infrastructure to be retrofitted without having to invest in new IoT-enabled infrastructure, sensors, meters, and/or CEP engines. The techniques described herein may be used in connection with energy consumption relating to manufacturing lines, workstations, or the like. Although some industries currently may measure such energy consumption on a gross or aggregate level, certain example embodiments help provide insights into current production processes by disaggregating energy consumption data where, for example, a single reading is provided for multiple components combined per energy phase.

In brief, aspects of certain example embodiments are implemented over design, build, and/or runtime phases. In this regard, system configuration is carried out in the design phase. Here, component models that describe power-consuming components, including their typical states and state transitions, are defined. During the build phase, the system automatically generates complex events that may be deployed to CEP engines for runtime monitoring. In the runtime phase, one or more CEP engines operate on the stream of meter readings that identify or predict component states in real-time. Details concerning the operation of each phase are provided below.

Example Design Time (Model Definition) Related Techniques

Figure 2:
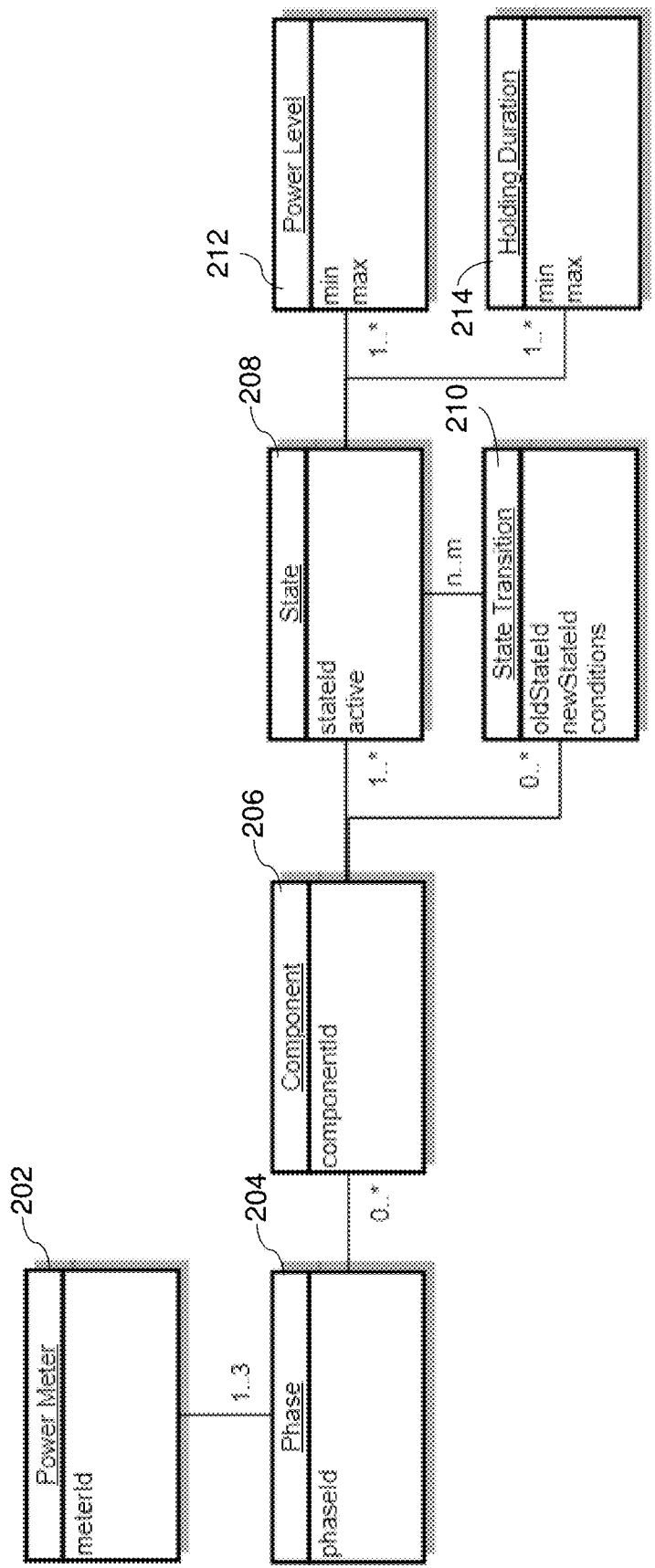
FIG. 2 is an example model that may be used in connection with power meter dis aggregation, in accordance with certain example embodiments.

For each relevant power consuming-component behind a given power meter, a component model is created as a specialized form of a finite state machine. In this regard, FIG. 2 is an example model that may be used in connection with power meter disaggregation, in accordance with certain example embodiments. In FIG. 2, a power meter 202 is associated with different phases 204 relating to a component 206. Each have identifiers associated therewith.

The component model of certain example embodiments is designed to specify measurable characteristics of the resource/component, and to describe related states. In the energy context, for example, the power levels and holding durations that characterize the component state's power consumption, and to describe preceding and succeeding states. Thus, in addition to the identifier of the component 206 and an optional description, one or more component states 208 can be defined. States are assigned identifiers. Each component 206 has at least one state (idle state "0"), which is also the default state. Components can be in one state only, which is then referred to as the "active" state, which may be signified as a simple flag or other binary indicator. If there is more than one state 208 for a component 206, potential state transitions 210 also are defined. State transitions 210 often follow a logical pattern implied by a manufacturing process and the corresponding machining operations (e.g., polishing operations may not precede cutting or drilling operations) that can be defined in state transition models, and conditions may be attached to the state transitions to specify when a transition should be made, what should happen upon a transition, etc. One condition might be that a transition may only occur if a certain power level is exceeded (such as, for example, transitions to an emergency shutdown state).

State definitions comprise the typical power level boundaries 212 (e.g., specifically in terms of min/max values) and a holding duration range 214 (e.g., specifically in terms of min/max values min/max) that may be identified in configuration runs. To determine states 208 and respective power levels 212, existing mathematical techniques such as commonly utilized Haar Wavelet transformations may be applied to power readings. For each state power level 212, a margin may be defined that can be used as a parameter to fine-tune the model. A margin may define a range around a typical value so, for example, for a power level of 2 and a "margin" of 0.5, the allowed range would be from 1.5 to 2.5. In this way, a margin may be thought of as setting forth upper and lower thresholds. Of course, a margin may start or stop with a zero point and thus may be thought of as being only one threshold in some instances.

Figure 1:
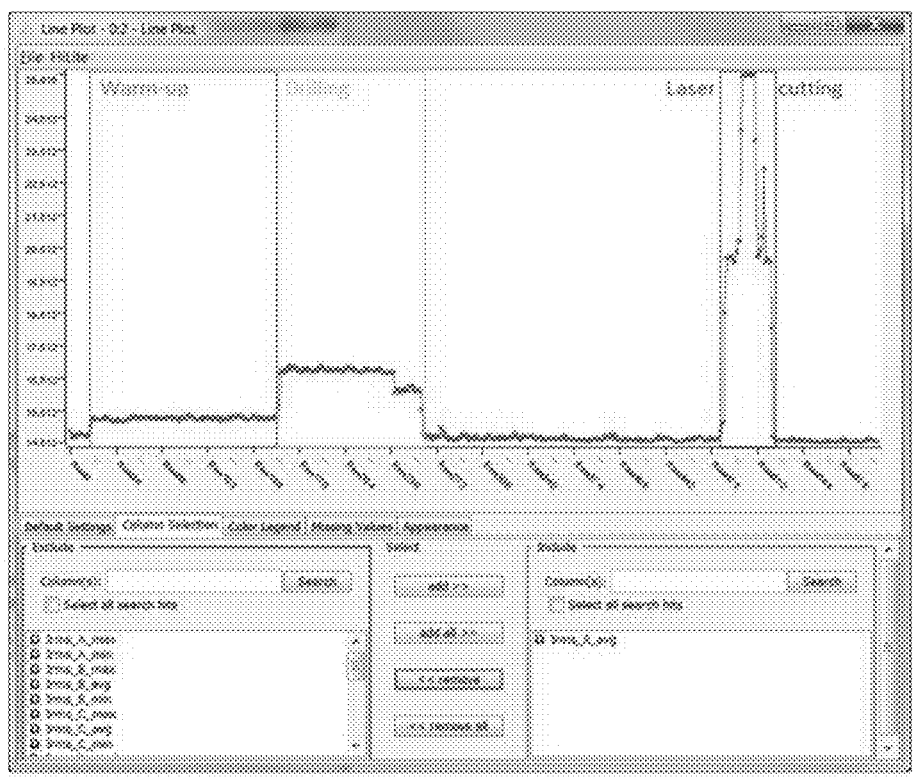
FIG. 1 shows an example of a power load measured at a power meter, with respective power load profiles for individual manufacturing steps.
Figure 3:
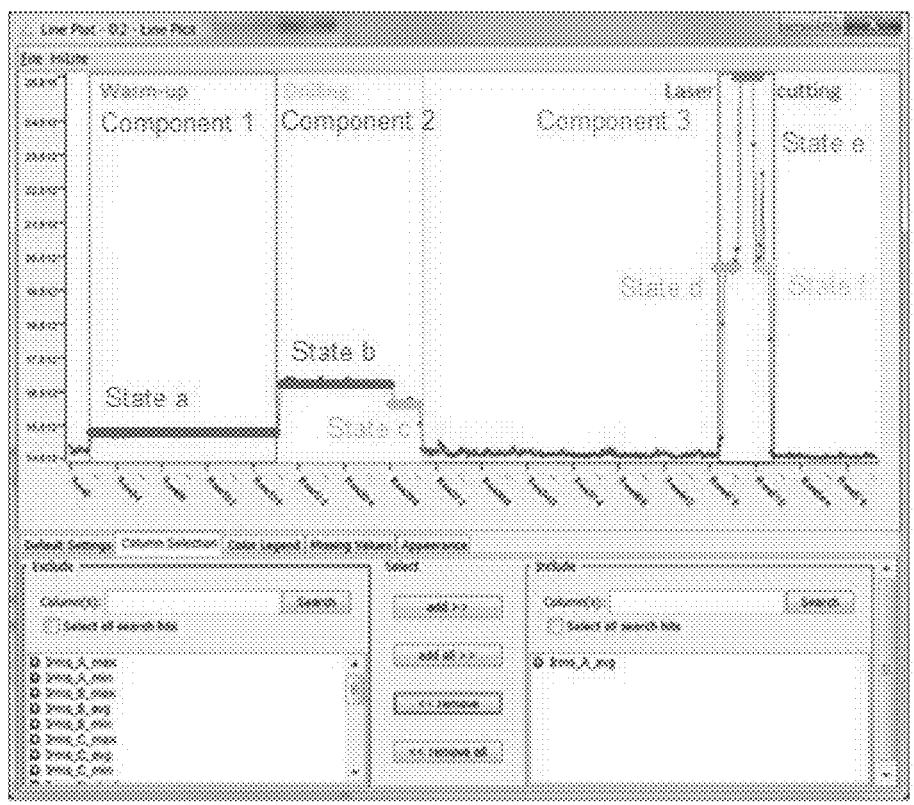
FIG. 3 is similar to FIG. 1, except that real-world state power levels have been "reduced" or disaggregated for multiple components and additional candidate states, with respective power levels shown.

FIG. 3 is similar to the FIG. 1 example, except that real-world state power levels have been "reduced" or disaggregated for multiple components and additional candidate states, with respective power levels shown. As in FIG. 1, in FIG. 3, after a warm-up phase, and once a drilling process is completed, a laser cutter is used to cut out individual parts from the sheet metal. Thus, there are three phases involving three components and six states, with transitions being defined between old and new states, and with optional conditions being attached to the state transitions.

Figure 4:
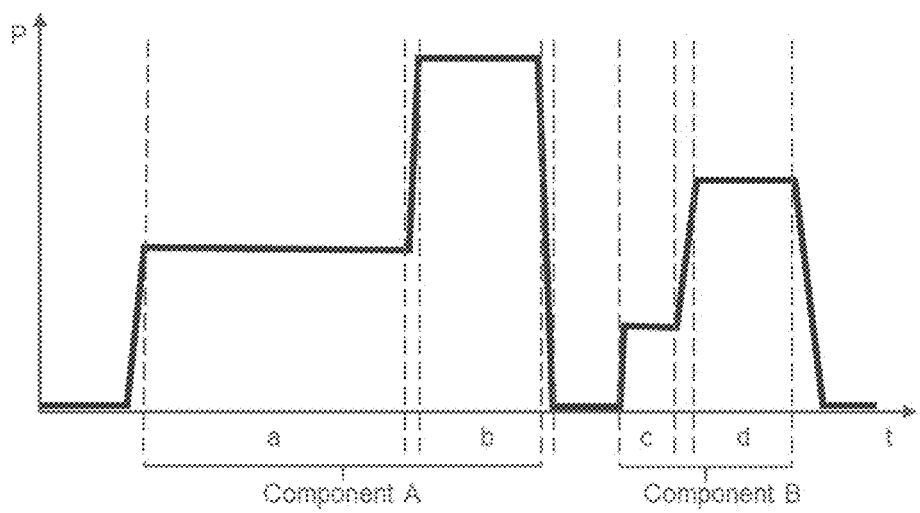
FIG. 4 provides a simplified example scenario power load profiles, which are used to demonstrate how certain example embodiments operate.

A simple example scenario will be used to help explain aspects of certain example embodiments. Within this example scenario, there are two components (A and B) connected to phase 1 of power meter 1 with a simulated power load profile as depicted in FIG. 4. FIG. 4 thus provides a simplified example scenario power load profiles, which are used to demonstrate how certain example embodiments operate. All power states ranges and holding duration ranges used in the example are listed in the following table.

| Power Meter | Phase | Component | State | Power Level | Holding Duration | State Transition |
|---|---|---|---|---|---|---|
| 1 | 1 | A | 0 | [0, 0] | [0, .] | 0->a |
|   |   |   | a | [0.95, 1.05] | [30 s, 60 s] | {a->0, a->b} |
|   |   |   | b | [1.95, 2.05] | [5 s, 10 s] | {b->0} |
| 1 | 1 | B | 0 | [0, 0] | [0, .] | 0->c |
|   |   |   | c | [0.45, 0.55] | [0 s, 10 s] | c->d |
|   |   |   | d | [1.45, 1.55] | [10 s, 12 s] | d->0 |

In a real-world scenario, this information may be retrieved from the component's specifications, or by performing a calibration run for each component.

Figure 5A:
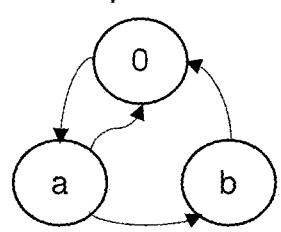
FIGS. 5A-5B are state diagrams depicting potential state transitions for the components shown in the FIG. 4 example.
Figure 5B:
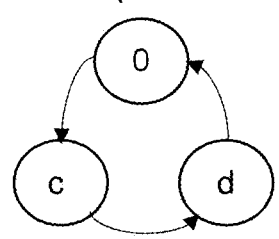

As shown in Table 1, component A can be in three different states (0, a, and b). From idle state "0", the component can transition to state "a". From state "a", the component can transition to state "0" or "b". From state "b", the component can return to state "0". FIGS. 5A-5B are state diagrams depicting potential state transitions for the components shown in the FIG. 4 example and discussed in the table above.

Figure 6:
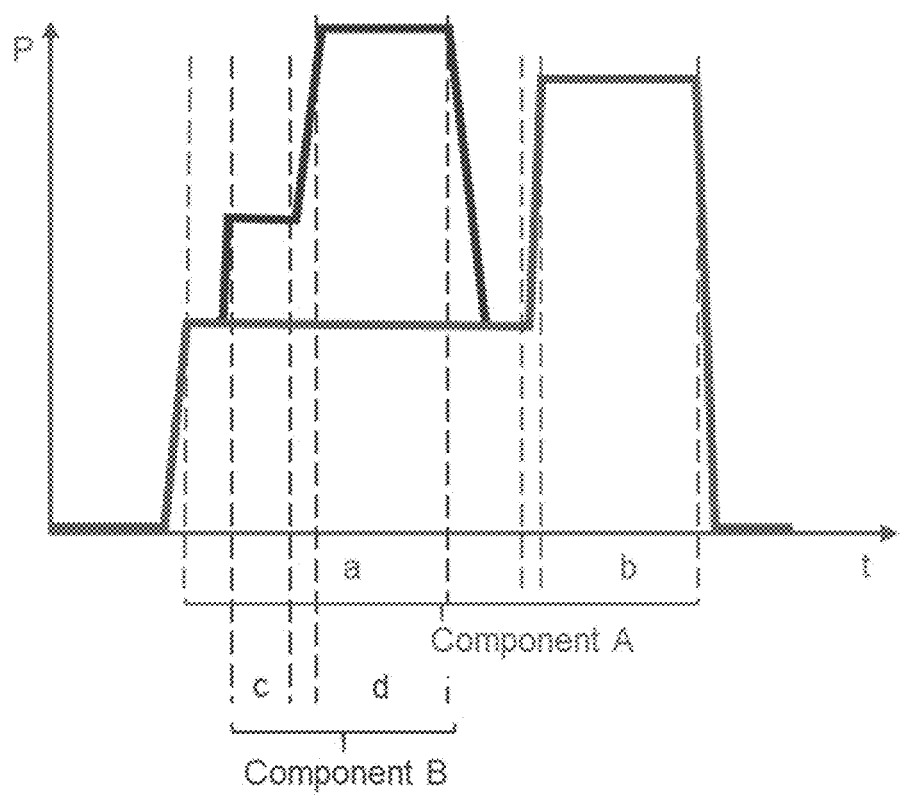
FIG. 6 shows a power meter reading for composite component states caused to simultaneous component activities, which may underlie the FIG. 4 example scenario.

In the FIG. 4 example, the components and their states are illustrated in sequence. However, in reality, the components behind smart meters may be operating simultaneously. If the components may operate synchronously, a meter reading as depicted in FIG. 6 might be obtained. That is, FIG. 6 shows a power meter reading for composite component states caused to simultaneous component activities, which may underlie the FIG. 4 example scenario. Composite events or states thus may be defined in certain example embodiments, e.g., as discussed in greater detail below.

Example Build Time (Generation of Complex Event Definitions) Related Techniques

Once the above models are defined, they can be used by the system to generate CEP specific event definitions and queries. Event definitions are defined as platform-independent models that describe the rules and conditions (in this sense, the "logic", which may be expressed programmatically) as to when states are being changed and/or events are being triggered, while abstracting any CEP engine specific technology. These platform-independent models may be automatically transformed into CEP engine specific code that can be executed at runtime. This advantageously allows the system to deploy the generated events on multiple CEP engines while only having to define the logic once. These platform-independent models may be represented as computer data structures (e.g., in accordance with a schema matching or similar to that presented in connection with FIG. 2) and/or generic program logic statements that is convertible, as detailed below.

At build time, first, plausible state definitions are generated. For each state defined in the component models, an event definition is generated by the system. These are the building blocks for actual state queries defined below. A plausible state event is a notification that is sent by the CEP engine if the state of a component is potentially active.

One criterion defining whether a state is potentially active is the meter reading's power level. The state may only be active if the current power reading (event "reading") is above the state's power level minus the state's optional margin. Also, the state's transitions and holding durations are included in the event definition. Here, a state can be active only if the preceding state event is present in a time window of the preceding state's maximal holding duration. Symbolically, then, a plausible state for state "X" (PX) may be represented as:

$$PX=\text{event}(\text{reading.powerLevel} \geq (X.\text{powerLevel.min}-X.\text{powerMargin}) \land \text{predecessor}(X) \text{ occurred within } X.\text{holdingDuration.max})$$

In the example scenario outlined above, component B's state "b" is considered plausible if the reading's power level is larger than the state's minimal power level (which is specified as 1.95 in the above table) and if there was a state "a" detected within the state's maximum holding duration (which is specified as 10 seconds in the above table). When using a power margin value of 0.25, the following event definition ("pb") for plausible state b is generated:

$$Pb=\text{event}(\text{reading.powerLevel} \geq 1.95-0.25 \land a \text{ occurred within } 10 \text{ s})$$

It will be appreciated that the latter condition (occurrence within 10 seconds) helps track whether state "b" will expire, meaning that it cannot last longer than the state's maximum holding duration.

In the example real-world scenario, the plausible event definition would describe that the "drilling" state would be plausible if the power level is within the typical range of power consumption and the "warm-up" state was previously active.

Second, potential state combinations are determined. Potential state combinations describe which component states may be active at the same time. As alluded to above, a single meter may measure an aggregated consumption of multiple components. Thus, it may become important to know which combinations the entire system may encounter.

Based on the model definition, a set of potential state combinations (P) are determined by creating the Cartesian product of the set of component states for each component ($S_1, \ldots, S_n$ for n components):

$$P = S_1 \times \ldots \times S_n$$

Here, P represents the potential state combinations, $S_i$ corresponds to the set of states for a given component i, and the lower case s symbols represent individual states for the corresponding set $S_i$.

In the simplified example above, the following component state combinations are possible:

$$P=\{0,a,b\} \times \{0,c,d\} = \{\{0,0\},\{0,c\},\{0,d\},\{a,0\},\{a,c\},\{a,d\},\{b,0\},\{b,c\},\{b,d\}\}$$

Third, optional filtering of potential state combinations may be performed. The list of potential state combinations may be filtered down if there are process-induced interdependencies between the states of components. For example, in the hypothetical production line, the polishing machine's components would only be active if previous manufacturing steps had already been completed and, hence, these states would never occur at the same time.

Fourth, composite state event definitions may be generated. One main challenge with meter decomposition relates to the fact that multiple components may be active at the same time, which means that, at the meter, only the sum of all power consumptions is measurable. To determine each component's state, composite state event definitions are introduced. Composite state event definitions are complex events that describe a specific combination of component states. In this sense, they are technical representations of all potential state combinations.

With the potential state combinations defined, the system generates complex event definitions for them. A composite component state can be assumed to be active if all of the member events are plausible ($p_1 \ldots p_n \in P$) and the power reading is within the interval of the sum of all member state power levels minima (min) and the sum of all member state power levels maxima (max).

$$E=\{\min \leq \text{reading.powerLevel} \leq \max \land p_1 \text{ and } \ldots \text{ and } p_n \text{ occurred} | p_i \in P$$

for every $i \in \{1, \ldots, n\}\}$, with $n$ being the number of member events The identified composite state events represent the currently-assumed states of all components behind a single phase reading of a power meter. These events are sent to the CEP engine or any other event listener and may be used for visualization or automation purposes.

In the simplified example above, the composite component state {b,c} is considered active (the current state) if: potential state pb is active, potential state pc is active, and the power reading in [2.25, 2.75] is present at a margin of 0.25.

Fifth, CEP engine specific complex event definitions are built. That is, based on the generated platform-independent event definitions, corresponding platform specific complex event definitions can be generated and can be deployed to one or more CEP engines. The transformation of platform-independent event definitions into Apama event monitors is provided below as one example of this operation.

Example Runtime Related Techniques

During runtime, a CEP engine's event correlator evaluates the current meter reading event and infers all plausible component states. The plausible events are communicated as events on their own that are used to infer the current component states. If a state cannot be determined with certainty, an escalation event is raised that could trigger the execution of a more complex calculation (e.g., execute a PMML model). Certain example embodiments also may assign a certainty level and communicate all plausible constellations with their respective certainty level. Certainty levels can be determined in a variety of ways and may depend on additional information (such as, for example, Manufacturing Execution System (MES) system information). One way of accomplishing this includes using the standard deviation of a composite event's sum of power levels to the actual power reading. Another implementation may assign certainty modifiers depending on how frequent a state occurs. Still another implementation may gather information on the product that is to be produced and may filter out states that would not be required in the manufacturing process (i.e., certainty level is set to 0).

Example Implementation

Details concerning an example implementation are provided below. It will be appreciated that this example implementation is provided to help demonstrate concepts of certain example embodiments, and aspects thereof are non-limiting in nature unless specifically claimed. In this regard, details concerning an example implementation are provided in connection with various model types, Apama, EPL, and the like. Similarly, details concerning power meter readings are discussed.

Figure 7:
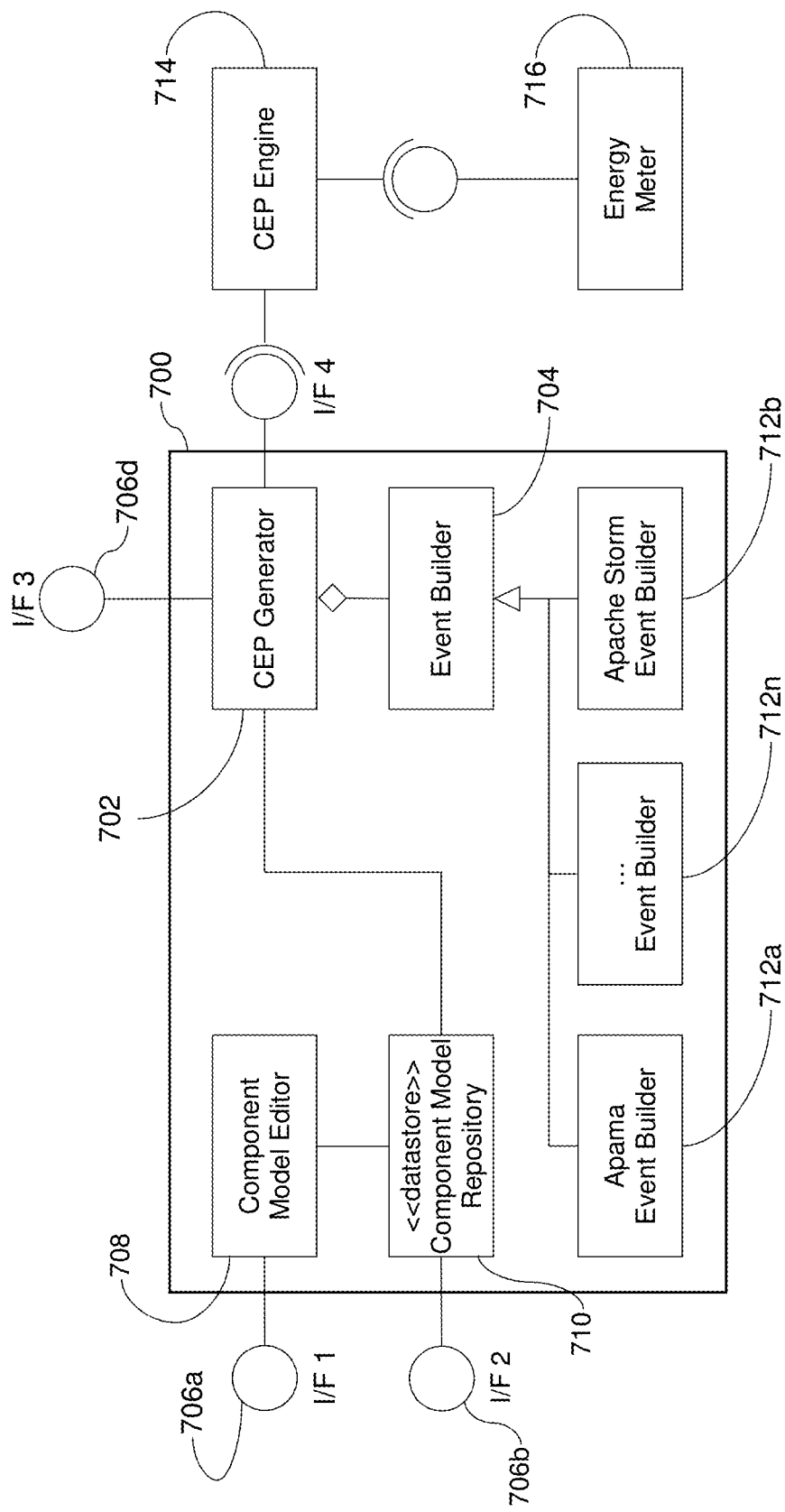
FIG. 7 is an example block diagram showing components of certain example embodiments.

FIG. 7 is an example block diagram showing components of certain example embodiments. In this example implementation, the system 700 comprises at least one CEP generator 702 that, among other things, processes provided component models (see FIG. 2 and description above) and uses at least one event builder 704 instance to create complex event definitions or event monitors.

For data/model ingestion purposes, the CEP generator 702 may provide a first interface 706a for integration with one or more external component model designers and/or provide an internal component model designer module, e.g., as a part of a component model editor 708, so that models can be built internally. The component model editor 708 additionally or alternatively may provide a second interface 706b to import (or at least retrieve on-the-fly) externally created component models. Retrieved and/or internally-created models may be stored in an internal component model repository 710 or in an external data store accessible by the CEP generator 702, e.g., via the component model repository 710, the external data store, and/or one or more of interfaces. The component model repository 710 may assist with version control of the models. The ARIS Business Server, provided by the assignee, can be used for repositories in certain example embodiments.

Once the scenario relating to the to-be decomposed streaming in data is in essence "known" to the CEP generator 702 by virtue of being specified by one or more component models stored in either the local component model repository 710, an external component model repository accessed directly by CEP generator 702 or retrieved via a third interface 706c, the CEP generator 702 passes each component model to the event builder 704, which in turn handles further processing internally or activates an instance appropriate for the source of the model.

The event builder instances 712a-712n carry out transformations of complex state events into CEP specific implementations. For example, event builder instances 712a-712b may provide CEP specific implementations for Apama event monitors and Apache Storm event definitions, respectively. It will be appreciated that instances appropriate for other specific implementations may be provided in different example embodiments. The output generated by the event builder 704 is stored as files or communicated to a fourth interface 706d for implementation. With respect to the latter, for example, the event builder 704 may gather the generated output for direct deployment to a CEP engine 714 via the CEP generator 702 using the fourth interface 706d.

For the example scenario, the defined component models for component A and B are passed to the Apama event builder instance 712a. The Apama event builder instance 712a transforms state information into an event monitor according to Apama EPL syntax. Details regarding the transformation procedure of component models into EPL code are provided below. Thus, the CEP generator 702 takes the component models describing the scenario and uses the CEP engine specific event builders to configure the CEP engine 714, enabling it to detect and emit "normal" and composite state events. The energy meter 716 provides an interface 706e that the CEP engine 714 can access (e.g., the CEP engine 714 can subscribe a listener) to aid in these operations.

It will be appreciated that the various interfaces described herein are structural in nature and may include application programming interfaces (APIs), import/export modules build into software platforms, physical cable couplings, and/or the like. These are examples of computerized data exchange interfaces. The local component model repository 710 may be any suitable non-transitory computer readable storage medium. It may include database functionality, provisions for version control, and/or the like. Other components in the system 700 in FIG. 7 may be implemented as hardware and/or software modules. For example, the system 700 may be a computer platform including at least processor and a memory coupled thereto, the memory storing instructions that correspond to software modules suitable for supporting the CEP generator 702, event builder 704 and/or specific instances thereof, component model editor 708, etc. In this sense, separate software modules may be provided for each of these components, or the components may be provided by virtue of different software module arrangements in different example embodiments. The CEP engine 714 is shown as being outside of the system 702, but it may be a part of it in certain example embodiments. The CEP engine 714 may be implemented as a software program residing on a computer system. An event bus may be connected thereto. The event bus may receive events from the CEP engine 714, once it is configured by the CEP generator 702. Moreover, events from the event bus may be subscribed to by the CEP engine 714 or listeners connected thereto to determine whether states are being entered, whether escalation processing is desired, etc. Similar to the CEP engine 714, the energy meter 716 may be included within the system 700 in certain example embodiments. Although only one energy meter is shown in FIG. 7, it will be appreciated that the techniques described herein may work in connection with plural energy meters. Moreover, it will be appreciated that a plurality of energy-consuming components may sit behind even the single energy meter 716 shown for example in FIG. 7. It is this energy meter 716 that reports aggregate data from those plural components, and those plural components provide measurable characteristics of the resource utilization (in this instance, energy consumption).

The sample model described above is used to demonstrate how event definitions can be generated automatically. Based on the model information, the system's CEP generator 702 can automatically create event definitions that are transformed into the desired CEP language using an event builder instance. As noted above, in this example, the Apama event builder instance 712a is used for the definition and correlation of event streams in EPL. In a nutshell, the appropriate instance traverses the platform-independent model and creates code structures for the target language. The following program code listing provides appropriate Apama EPL event definitions based on the sample model above:

```
event MeterReading {
    string meterId;
    integer phase;
    float powerReading;
}
event PotentialComponentState {
    string componentId;
    string stateId;
}
```

Platform-specific event definitions are automatically generated by the CEP generator 702 based on the provided power meter model using event builder instances. For example, for Apama, event sequences can be determined by event monitors and queries. Here, the event patterns are defined by the system based on the meter model described above.

In the example, the Apama event builder instance 712a could generate the monitor specified in the program code listing provided below to determine the potential states of the monitored components in Apama EPL.

The following pseudo-code describes the procedure of generating an event monitor for identifying potential component states. The pseudo-code may be executed by the Apama event builder instance 712a. In that sense, the Apama event builder instance 712a may be a software module running within the system 702.

1. Determine potential state combinations S, e.g., according to the approach set forth above.
    2. Create monitor script for potential states.
    3. For each state s in all potential state combinations S:
        a. Determine power level range r for s by calculating the sum of the powerLevel min/max values for each state in s.
        b. Create MeterReading listener where r.min>=powerReading<r.max
            i. For each state in s, send PotentialComponentState event Using the scenario defined in the table above and a margin of 0.2 results in the following EPL monitor script, which corresponds to an Apama EPL monitor for detection of potential component states:

```
monitor PotentialStatesMonitor {
    action onload( ) {
        on all MeterReading(powerReading > 0 && powerReading < 0.75) {
            // {c}
            send PotentialComponentState("B", "c") to "PcsChannel";
        }
        on all MeterReading(powerReading >= 0.75 &&
            powerReading < 1.25) {
            // {a}
            send PotentialComponentState("A", "a") to "PcsChannel";
        }
        on all MeterReading(powerReading >= 1.25 &&
            powerReading < 1.75) {
            // {a, c} | {d}
            send PotentialComponentState("A", "a") to "PcsChannel";
            send PotentialComponentState("B", "c") to "PcsChannel";
            send PotentialComponentState("D", "d") to "PcsChannel";
        }
        on all MeterReading(powerReading >= 1.75 &&
            powerReading < 2.25) {
            // {b}
            send PotentialComponentState("A", "b") to "PcsChannel";
        }
        on all MeterReading(powerReading >= 2.25 &&
            powerReading < 3) {
            // {a, d} | {b, c}
            send PotentialComponentState("A", "a") to "PcsChannel";
            send PotentialComponentState("B", "d") to "PcsChannel";
            send PotentialComponentState("A", "b") to "PcsChannel";
            send PotentialComponentState("B", "c") to "PcsChannel";
        }
        on all MeterReading(powerReading >= 3) {
            // {b, d}
            send PotentialComponentState("A", "b") to "PcsChannel";
            send PotentialComponentState("B", "d ") to "PcsChannel";
        }
    }
}
```

As channel name for potential component states, "PcsChannel" was defined in the Apama Event Builder implementation.

Note that four potential component states are sent when the power reading is between 2.25 and 3, as there could be a composite event a+d or b+c, which will be sorted out by another monitor as explained below.

For composite state event definitions, the following monitor may be generated:

```
monitor ComponentState {
    action onload( ) {
        // {b} - must be preceded by ComponentState a within 60
        // seconds (maximum duration of state "a")
        on all ComponentState(stateId="a") as a {
            on PotentialComponentState(stateId="b") within(60.0) {
                send ComponentState("A", "b") to "ComponentStateChannel";
            }
        }
        // {d} - must be preceded by ComponentState c within 10
        // seconds (maximum duration of state "c")
        on all ComponentState(stateId="c") as c {
            // ...
        }
        // ...
    }
}
```

For component states, the channel name "ComponentStateChannel" was defined in the Apama Event Builder implementation.

Based on the above, it will be appreciated that the definitions may be implemented as formalistic representations in the form of program logic statements or code deployable and usable to configure the CEP engine.

Figure 8:
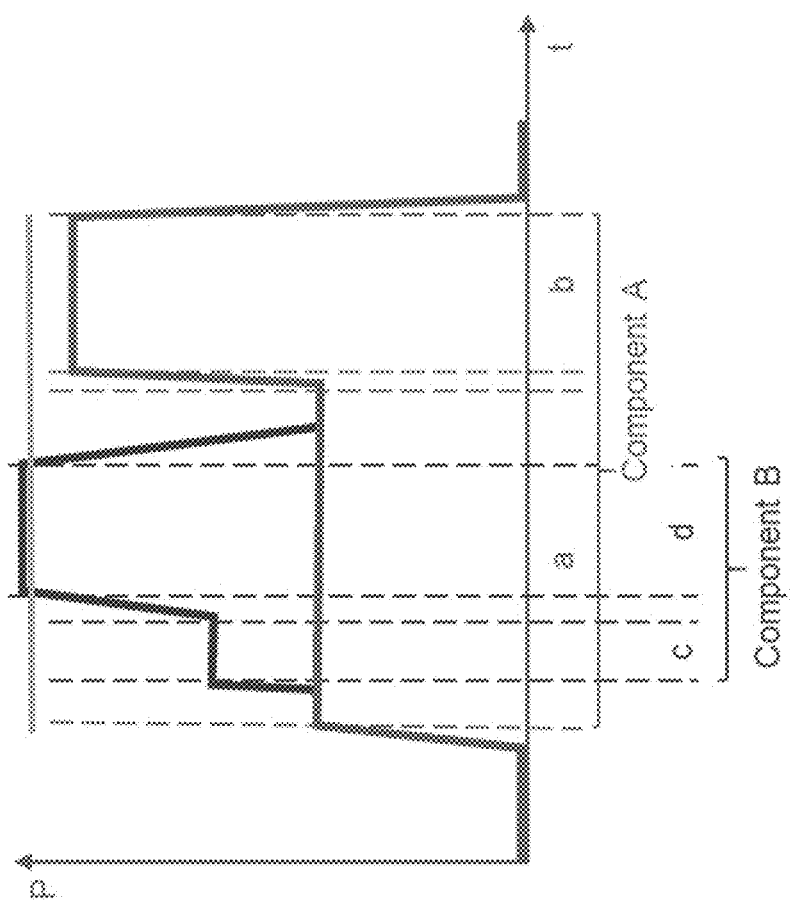
FIG. 8 shows a potential state being detected in the FIG. 6 decomposed power meter readings.

As an example, assume that in the demo scenario depicted in FIG. 4 and described in in the table above, a meter reading of 2.05 is obtained and there is an assumed margin value of 0.4. This is shown schematically in FIG. 8. That is, FIG. 8 is similar to FIG. 6, except that FIG. 8 shows a potential state being inferred based on the readings above the margin.

In the first step, the following PotentialComponentStates are sent by the monitor script: {b}, {a, d}, {b, c}. If there is an identified component state "c" within the maximum holding duration of state "c", component states "a" and "b" are assumed active and respective events are sent. If there is no active component state "c" previously, component state "b" is considered active.

If no ComponentStates are determined within a certain time window, the system state cannot be inferred, and a more complex analysis such as using machine learning models may be triggered for conflict resolution. In certain example embodiments, an escalation mechanism might detect the absence of component state events within a time window and can then trigger the escalation event. The escalation event may in turn trigger the running of a more complex model that is more computationally intensive, e.g., to help determine whether there is a hidden state based on a machine-learned model or other off-line (non-real time) processing.

Provisions for "conflict resolution" thus may be made in certain example embodiments. For example, as alluded to above, if the state of meter components cannot be determined by power meter disaggregation, the system may send an escalation event that could trigger a more complex situational analysis, such as executing trained machine learning models. If the system state can be determined by this escalation approach, a respective ComponentState event may be sent to aid in further reasoning of the monitor scripts. That is, the applicable model that the event builder uses to generate platform-specific code may be updated, the event builder may be re-run, and the CEP engine may be updated accordingly.

Potential indicators for a conflict in determining the component states may be multiple conflicting component state events (such as "idle" and "processing" state events) being generated at the same or approximately the same time (e.g., depending on the application, within 10 ms of one another or within 10 s of one another, etc.), insufficient confidence levels in systems where confidence levels are utilized, etc. If a conflict cannot be resolved, an alert event may be sent by the system that can be used to trigger warnings, ask for human input (e.g. by the worker at the station), etc. The alerts may be prompts to clarify the current state, notification messages in user interfaces such as dashboards, text or email messages, and/or the like.

The identified component states are communicated as events by the CEP engine and thus can be integrated into other application systems, e.g., via one or more appropriate interfaces, by exporting data files that can be imported, etc. For example, the information may be directly integrated into IoT platforms such as Software AG's Cumulocity. Other applications may include business process execution engines and ERP systems where component state events may flag the completion of a manufacturing process step. Also, performance metrics may be gathered by monitoring component state event sequences (e.g., processing times).

Based on the description above, it will be appreciated that events may be emitted on three channels in certain example embodiments. In certain example embodiments, differently-configured monitors may watch the different channels. In this example implementation, the first channel receives power reading events, the second channel is for potential component state (PCS) events as described above, and the third channel is the component state (CS) channel. The CS channel may in essence be output, indicating a change in state. In certain example embodiments, the channels may be implemented as different event buses or other physical or separate communication channels. Certain other example embodiments may implement different logical channels on a single event bus or the like, e.g., with messages being tagged or otherwise marked (in a header, message body, XML or other tag, etc.) to indicate the logic channel to which it is being emitted. The event bus(es) may be implemented using any suitable message pattern such as, for example, a publish/subscribe model or a variant thereof.

Figure 9:
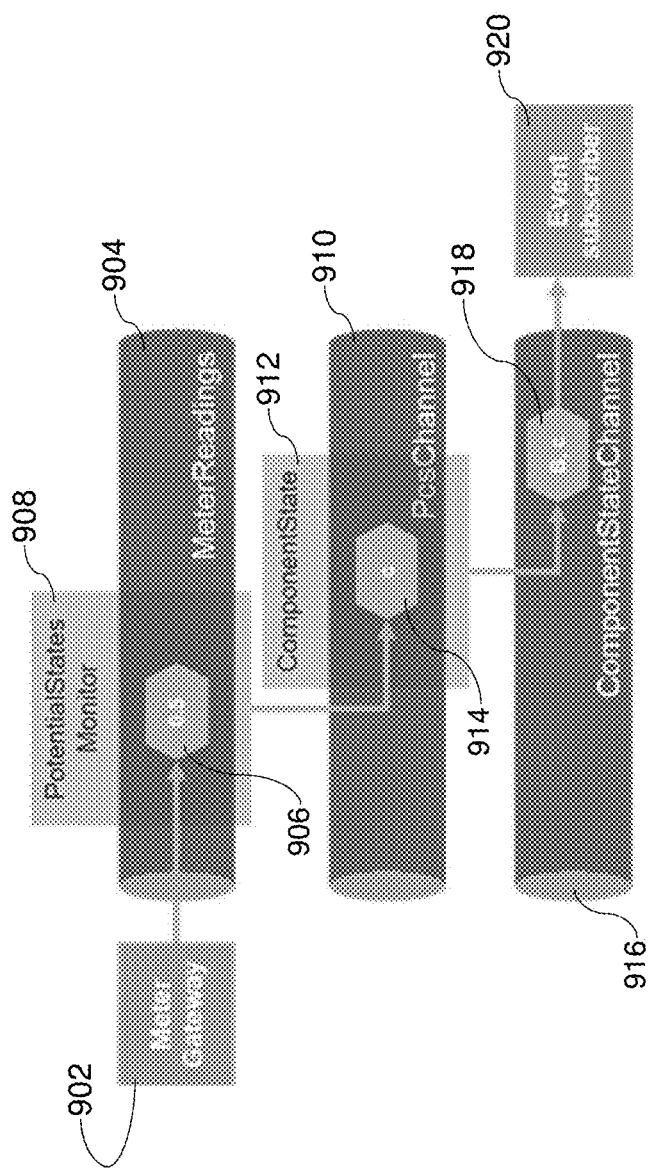
FIG. 9 is a schematic view of how different event channels can be used in accordance with certain example embodiments.

In this regard, and in keeping with the example above, FIG. 9 is a schematic view of how different event channels can be used in accordance with certain example embodiments. In FIG. 9, readings from the meter (via a meter gateway 902 or other suitable interface) are sent to the MeterReadings channel 904. There, potential state events 906 (indicative of the readings) are identified by the monitor PotentialStatesMonitor 908 and sent to channel PcsChannel 910. There, the ComponentState 912 monitor correlates incoming events and sends identified component states 914 to the channel ComponentStateChannel 916. Applications can subscribe to the ComponentStateChannel 916 in order to be notified of identified component states 918, e.g., for monitoring, visualization, alerting, and/or other purposes. For instance, an example event subscriber 920 is shown in FIG. 9. It will be appreciated that the meter gateway 902 and/or the event subscriber 920 may be external to the system, or at least the messaging system including the various channels shown in FIG. 9. It also will be appreciated that the names of the channels may be defined in the event builder (discussed above) and can be chosen by the developer of the respective event builder implementation in certain example embodiments. CEP queries may be thought of as self-contained processing units. In certain example embodiments, they may be useful for partitioning incoming events according to a key and then independently processing the events in each partition. Processing here could involve watching for an event pattern and then executing a block of procedural code when that pattern is found. Thus, CEP queries could be used to define when events should be emitted to specific channels, what to do when events are received, etc., and may be implemented in connection with the various monitors shown in FIG. 9. The CEP queries may be implemented on one or more computing systems including processing resources such as, for example, a processor, memory, network interface, etc.

Besides industrial application in Industry 4.0 scenarios, the system could also be deployed to smart home systems for monitoring power consuming appliances. Also, it can be used in applications where no direct hardware or software sensors can be added. Hence it could also be applied to application systems if certain processes within an application cause a characteristic CPU load signature comparable to component's power consumption. In other words, the techniques of certain example embodiments have a wide applicability including monitoring power consumption in industrial, business, home, and other settings; usage of computing resources (e.g., where resource consumption is monitored in terms of CPU cycles, memory usage, number of threads, amount of physical non-volatile media storage, bandwidth utilization, etc.). In the computing context, for example, certain example embodiments may track CPU cycles and/or memory usage by different applications or application instances; bandwidth utilization based on network device operations, weather events, system-wide issues, network attacks; etc.

Based on the above, it will be appreciated that certain example embodiments advantageously provide a way of analyzing aggregated usage data (including energy meter usage data, processing resources usage data, and/or the like) in real-time using complex event processing technology, and deriving the current state of resource-consuming entities. The example techniques described herein advantageously allow current machine states to be determined without having to retrofit existing installations with dedicated sensors, meters, CEP engines, etc., which in any event may not always be feasible. By utilizing streaming analytics technology, a better real-time performance and reduced system load compared to classic computational models may be provided. Also, by breaking the evaluation into multiple steps (including potential state event identification and composite event identification), the system may be flexibly scaled. Here, multiple instances of the system could focus on specific tasks, e.g., one instance exclusively identifies plausible states, while another instance may identify composite state events, and so on. In this way, it is possible to basically have one instance of the system for each step of the disaggregation process, facilitating flexibility and expandability of the approach.

Certain example embodiments enable a CEP engine to establish one or more individualized component states for one or more of the individual components from the multi-component aggregate reading based on emitted events. This advantageously enables a new type of individualized data to be established from a different type of existing aggregate data, where the new data was not available or otherwise derivable from the multi-component aggregate data. The technical approach described herein involves a transformation of one type of aggregate data into a new type of individualized component data. It solves technical problems relating to, for example, monitoring individual components when only aggregate information is available, avoids redesign and redeployment of technical infrastructures where there are no IoT sensors, proprietary sensors, or older sensors, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computing system, comprising:
   at least one hardware processor; and
   a computerized data exchange interface to one or more sensors, the one or more sensors being configured to obtain a multi-component aggregate reading of how a resource is being utilized by one or more of a plurality of components, each component being a physical machine or element thereof;
   wherein the at least one hardware processor is configured to control the computing system to perform functionality comprising:
      for each component able to contribute to the aggregate reading, defining a respective component data structure specifying at least one measureable characteristic of the respective component related to the aggregate reading and at least one state into which the respective component is enterable,
      wherein for each component that is able to enter into plural different states, the respective component data structure further specifies, for each different state, valid state transitions indicative of a predecessor state and/or a successor state;
      generating, from the component data structures, plausible state definitions defining when an event processing engine is to trigger a corresponding plausible state event to signify that a corresponding state enterable into via one of the components is potentially active;
      generating, from the component data structures, composite state event definitions, each composite state event definition corresponding to a potential state combination representative of two or more component states that potentially are concurrently active and including one or more required states and/or required state changes to occur within a predetermined time window;
      configuring the event processing engine to trigger events in dependence on the aggregate reading and the generated plausible state definitions and the generated composite state event definitions; and
      enabling the event processing engine to establish, based on triggered events, one or more individualized component readings for one or more of the individual components contributing to the multi-component aggregate reading of how the resource is being utilized.

2. The system of claim 1, wherein the at least one measureable characteristic is a level of resource utilization and a duration for which the level of resource utilization is held.

3. The system of claim 2, wherein the at least one measureable characteristic is determined automatically via one or more calibration runs of each of the components.

4. The system of claim 2, wherein the level of resource utilization is power level.

5. The system of claim 1, wherein the plausible state definitions for a given component specify minimal measurable characteristics and state transition information indicative of the corresponding plausible state event.

6. The system of claim 5, wherein the plausible state definitions further specify optional margin information indicative of the corresponding plausible state event.

7. The system of claim 1, wherein the generation of composite state event definitions includes generating a list of potential state combinations and filtering the list based on operational interdependencies prior to creation of the composite state event definitions.

8. The system of claim 1, wherein the generation of the plausible state definitions includes generating platform-independent models representing the plausible state definitions and converting the platform-independent models into code for the configuration of the event processing engine.

9. The system of claim 1, wherein the at least one hardware processor is configured to control the computing system to perform further functionality comprising when an inference as to individual component states cannot be made by the event processing engine from the aggregate reading based on the triggered events, causing a machine-learned model to be executed to make the inference.

10. The system of claim 1, wherein the at least one hardware processor is configured to control the computing system to perform further functionality comprising when an inference as to individual component states cannot be made with a certainty level above a predetermined margin by the event processing engine from the aggregate reading based on the triggered events, causing a machine-learning model to be executed to make the inference.

11. The system of claim 1, wherein each component is a physical computing device or software running thereon.

12. A method of configuring an event processing engine operably connected to one or more sensors configured to obtain a multi-component aggregate reading of how a resource is being utilized by one or more of a plurality of components, the method comprising:
for each component able to contribute to the aggregate reading, defining a respective component data structure specifying at least one measureable characteristic of the respective component related to the aggregate reading and at least one state into which the respective component is enterable,
wherein for each component that is able to enter into plural different states, the respective component data structure further specifies, for each different state, valid state transitions indicative of a predecessor state and/or a successor state;
generating, from the component data structures, plausible state definitions defining when the event processing engine is to trigger a corresponding plausible state event to signify that a corresponding state enterable into via one of the components is potentially active;
generating, from the component data structures, composite state event definitions, each composite state event definition corresponding to a potential state combination representative of two or more component states that potentially are concurrently active and including one or more required states and/or required state changes to occur within a predetermined time window;
configuring the event processing engine to trigger events in dependence on the aggregate reading and the generated plausible state definitions and the generated composite state event definitions; and
enabling the event processing engine to establish, based on triggered events, one or more individualized component readings for one or more of the individual components contributing to the multi-component aggregate reading of how the resource is being utilized.

13. The method of claim 12, wherein the at least one measureable characteristic is a level of resource utilization and a duration for which the level of resource utilization is held.

14. The method of claim 12, wherein the plausible state definitions for a given component specify minimal measurable characteristics and state transition information indicative of the corresponding plausible state event.

15. The method of claim 12, wherein the generation of composite state event definitions includes generating a list of potential state combinations and filtering the list based on operational interdependencies prior to creation of the composite state event definitions.

16. The method of claim 12, wherein the generation of the plausible state definitions includes generating platform-independent models representing the plausible state definitions and converting the platform-independent models into code for the configuration of the event processing engine.

17. The system of claim 1, wherein when an inference as to individual component states cannot be made by the event processing engine from the aggregate reading based on the triggered events, causing a machine-learned model to be executed to make the inference.

18. A method of transforming a multi-component aggregate reading into one or more individualized component states for one or more individual components in connection with an event processing engine being executed on a computing system including at least one processor and a memory, the method comprising:
configuring the event processing engine in accordance with the method of claim 12;
receiving the aggregate reading over an interface connected to one or more sensors;
triggering events using the configured event processing engine; and
determining the one or more individualized component states based on the triggered events and the aggregate reading.

19. The method of claim 18, further comprising providing the individualized component readings to an external component.

20. The method of claim 18, further comprising controlling usage of the resource based on the individualized component readings.

21. A non-transitory computer readable storage medium tangibly storing instructions that, when executed by a processor, configure an event processing engine operably connected to one or more sensors configured to obtain a multi-component aggregate reading of how a resource is being utilized by one or more of a plurality of components, by at least:
for each component able to contribute to the aggregate reading, defining a respective component data structure specifying at least one measureable characteristic of the respective component related to the aggregate reading and at least one state into which the respective component is enterable,
wherein for each component that is able to enter into plural different states, the respective component data structure further specifies, for each different state, valid state transitions indicative of a predecessor state and/or a successor state;
generating, from the component data structures, plausible state definitions defining when the event processing engine is to trigger a corresponding plausible state event to signify that a corresponding state enterable into via one of the components is potentially active;

generating, from the component data structures, composite state event definitions, each composite state event definition corresponding to a potential state combination representative of two or more component states that potentially are concurrently active and including one or more required states and/or required state changes to occur within a predetermined time window;

configuring the event processing engine to trigger events in dependence on the aggregate reading and the generated plausible state definitions and the generated composite state event definitions; and enabling the event processing engine to establish, based on triggered events, one or more individualized component readings for one or more of the individual components contributing to the multi-component aggregate reading of how the resource is being utilized.

22. The non-transitory computer readable storage medium of claim 21, wherein the at least one measureable characteristic is a level of resource utilization and a duration for which the level of resource utilization is held.

23. The non-transitory computer readable storage medium of claim 21, wherein the plausible state definitions for a given component specify minimal measurable characteristics and state transition information indicative of the corresponding plausible state event.

24. The non-transitory computer readable storage medium of claim 21, wherein the generation of composite state event definitions includes generating a list of potential state combinations and filtering the list based on operational interdependencies prior to creation of the composite state event definitions.

25. The non-transitory computer readable storage medium of claim 21, wherein the generation of the plausible state definitions includes generating platform-independent models representing the plausible state definitions and converting the platform-independent models into code for the configuration of the event processing engine.

26. The non-transitory computer readable storage medium of claim 21, wherein when an inference as to individual component states cannot be made by the event processing engine from the aggregate reading based on the triggered events, a machine-learned model is executed to make the inference.

27. The non-transitory computer readable storage medium of claim 21, wherein the resource is CPU cycles and/or bandwidth, and the components include computing equipment and both physical and software components thereof.

* * * * *